United States Patent [19]
Kamide et al.

[11] 3,883,626
[45] May 13, 1975

[54] POROUS CELLULOSE ACETATE MEMBRANE AND A PROCESS FOR THE MANUFACTURE OF SAME

[75] Inventors: Kenji Kamide, Kyoto; Seiichi Manabe; Etsuko Osafune, both of Osaka; Tomio Sakamoto, Yokohama, all of Japan

[73] Assignee: Asahi Kasei Kogyo Kabushiki Kaisha, Japan

[22] Filed: Nov. 22, 1972

[21] Appl. No.: 308,769

[52] U.S. Cl. .............. 264/49; 210/321; 264/41
[51] Int. Cl. .............. B29d 27/04; C08b 21/04
[58] Field of Search .............. 264/41, 49

[56] References Cited
UNITED STATES PATENTS

| | | | |
|---|---|---|---|
| 3,285,765 | 11/1966 | Cannon | 264/49 |
| 3,310,488 | 3/1967 | Loeb et al. | 264/49 |
| 3,360,459 | 12/1967 | King et al. | 264/49 |
| 3,364,288 | 1/1968 | Loeb | 264/49 |
| 3,373,056 | 3/1968 | Martin | 264/49 |
| 3,483,282 | 12/1969 | Manjikian | 264/49 |
| 3,567,809 | 3/1971 | Ueno et al. | 264/41 |
| 3,592,672 | 7/1971 | Rowley et al. | 264/41 |
| 3,592,953 | 7/1971 | Ward et al. | 264/49 |

Primary Examiner—Eugene C. Rzucidlo
Attorney, Agent, or Firm—Armstrong, Nikaido & Wegner

[57] ABSTRACT

A process for the manufacture of a cellulose acetate porous membrane which comprises dissolving in a main organic solvent, cellulose acetate having an acetyl content of 20 to 62.5%, and adding to the solution a diluent solvent having a boiling point higher than the main solvent. To the solution, is added a metal salt, the metal portion of said salt being selected from Groups I-III of the Periodic Table to provide a homogeneous solution. The resulting solution is cast onto a polished plane surface to form a thin film and the solvent is removed from the film by evaporation at elevated temperatures, and subsequently, the metal salt is removed from the film by dissolving the salt therefrom to produce a porous membrane.

11 Claims, 21 Drawing Figures

POROUS CELLULOSE ACETATE MEMBRANE AND A PROCESS FOR THE MANUFACTURE OF SAME

FIELD OF THE INVENTION

This invention relates to an improved pervious cellulose acetate filtering membrane and a process for the manufacture of same.

The term "filteration" or "filtering" as used throughout this specification and in relation to the present invention concerns the screen filteration technique in which such a pervious membrane is utilized as having ideally an infinitely large number of fine perforations passing therethrough and each opening at the front and rear surfaces of the membrane in the form of substantially circular opening.

It should be stressly understood from the foregoing and following description that the pervious cellulose acetate filtering membrane according to this invention represents a substantial difference in the filtering mechanism from that as employed in the depth type filteration in which the filtration is carried out through filtering fine gaps formed among the fibers or particles constituting the filtering material, as appearing in a filter paper glass fiber filter, porous mass filter or the like.

In recent decades, the development of the screen membrane type filter has been attracted grave attention of those skilled in the art, and by those engaged in various industrial fields such as electronic, foodstuff, fermentation and medicament industries, in addition to those engaging in medical care services, for the purpose of micronic filtration for filtering off micron or less micron order fine particles. In this respect, as a nearly ideal model, "Nuclepore" membrane has been developed by General Electric Company, Schenectady 5, N.Y., which membrane is reportedly prepared from a polycarbonate material membrane formed with infinite number of fine and substantially round perforations of $0.2 - 1.0\ \mu$ diameter, through the neutron bombardment and the etching technology. Pore density amounts reportedly to $10^7/cm^2$ at the maximum. It is believed, however, that the practical manufacture of this kind of Nuclepore membrane is very difficult and troublesome on account of the introduction of the neutron bombardment which means naturally a highly intricate technique.

As a further example, "Millipore" and "German" membranes are already known, as produced by Millipore Ltd., Mass., and German Inc., Ill., respectively, from cellulose acetate as the material and fabricated into finely porous filter membranes. These membranes are known nominally as of screen membranes. According to our knowledge, however, these membranes have, strictly to say, the depth type character. The membrane, in these cases, is composed practically of a fibrous structure, thus the filtering pores being uncertain in their size and configuration. A considerable drawback may be encountered in frequent clogging of the pores and in the very difficulty of control of the particle sizes capable of passing therethrough.

DESCRIPTION OF THE PRIOR ART

It is known to manufacture a non-semipermeable porous membrane in such way that cellulose acetate is dissolved in an organic solvent, preferably acetone, and then diluted with water and the thus prepared solution is cast on a polished plane surface into a thin layer which is subjected to evaporation of the solvent and the like non-solid constituents, so as to finally provide the desired membrane. This kind of membrane manufactured by the simpler solvent evaporative method must be carried out under delicately controlled conditions in the selection of the solvent, the evaporative temperature and the surrounding humidity conditions. On the other hand, the strength of the thus prepared porous membrane amounted only to 30 kg/cm² at the maximum. The filtering mechanism of this kind membrane was found in its substance as of the depth type. It has been thus highly difficult and practically impossible to provide a cellulose acetate porous membrane filter substantially of the screen membrane type.

It has been, therefore, a strong and sincere desire to obtain a tough screen membrane type cellulose acetate porous filter, devoid of the aforementioned drawbacks inherent in the conventional solvent evaporative process and having circular or nearly circular and substantially uniform fine pores and representing a large pore opening ratio relative to and appearing at the front and rear surfaces.

When observed, on an scanning type electron microscope, the surface of a representative sample of the commercially available cellulose acetate porous filter membrane or that which has been prepared from a cellulose acetate solution including water content and plasticizer, upon cast on into a thin film and solidified to a membrane by evaporation, the opening extremity of the fine pore is seen as defined by irregular and undulating wall surfaces. With such undulating structure of pore-end defining wall surfaces, the pore diameters are, even when observed at a single pore opening, highly irregular and variable. Since, a pore diameter as measured between the valleys on the surrounding wall may be a larger value, while that measured between the ridges on the surrounding wall may represent a smaller value, and so on. With such irregular pore structure, a desirous efficient filtering performance as attainable with the screen membrane filter could not be realized.

It is a tendency prevailing among those skilled in the art to direct none of their attention to the relationship between the filtering performance of the membrane and the more specific and detailed configuration of the both opening extremities of the pore appearing at the both surfaces of the membrane and the pore diameter ratio of same relative to the both membrane surfaces. According to the conventional evaluation technique of the filtering performance of the porous membrane filter, the mercury penetration porosimater has been almost exclusively employed by those skilled in the art, thereby providing a mean permeability of the overall distributed fine pores and thus no specific and detailed evaluation of the pore diameter distribution and of the specific pore opening configuration being made.

According to our practical experiments, it has been shown that there is a remarkable difference in the filtering performance of one and the same membrane filter when either surface thereof is caused to play the filtering role. On the other hand, and especially in the last decade, the screen type membrane filter providing easy reverse washing possibility is sincerely desired to be supplied.

In order to clarify the more true and reliable filtering performance of the screen type membrane filter, and to provide a substantially easy reversedly washable performance thereof, we have found upon execution of profound practicaly experiments that the pore diameter distribution on the both surface of the membrane, pore opening configuration appearing on these membrane surfaces and pore diameter ratio of each of the pores and relative to the front and rear surfaces of the membrane play conjointly a gave role. For this purpose, we have adopted as the measure for the desired performance evaluation, the photographs taken on the scanning type electron microscope, of the membrane surfaces, in place of the conventionally adopted pressurized mercury permeation process.

A representative structure of the conventional screen membrane type filter is such that the opening configurations of each fine pore appearing at the both surfaces of the membrane represent a substantial difference from each other. As an example, when the pore represents a substantially circular opening configuration at the front surface of the membrane, the same pore may frequently represent a highly irregular shape such as that of a natural sponge, at the rear surface. The particles to be filtered off by use of such filtering membranes are caught at the front surface thereof. In this case, it is generally observed that the pore density and the pore occupancy ratio per unit area as observed at the front surface of the membrane are substantially smaller than those on the rear surface, which means naturally a substantial drawback. The filtering performance of a screen membrane is governed by such membrane surface on which the smaller pore openings exist. Thus, this first type screen membrane represents a rather inferior filtering capacity. In addition, this type membrane shows a rather inferior strength of 30 kg/cm$^2$ or so at the maximum.

A second representative sample of the screen membrane type porous filter represents the configuration and size of the pore opening are similar at the both surfaces of the membrane. In this case, the strength is higher than that of the first kind of the membrane. However, the pore density and the pore occupancy ratio per unit area are rather smaller than those of the first kind membrane. In addition, the filtering resistance is rather higher than that of the first kind of the membrane. These are naturally rather more defective.

According to the experimental results carried out by us, it has been found that superior results in the desired sense are obtained when the screen membrane type cellulose acetate porous filter represents substantially circular pore openings as observed at the both surfaces of the membrane and the ratio opening of areas of each pore appearing at the both surfaces of the membrane amounts at least 3.0. This kind of improved screen membrane type filter is very tough in its strength, as will be more fully described hereinafter.

OBJECTS OF THE INVENTION

It is therefore an object of the present invention to provide a cellulose acetate screen membrane type symmetry porous filter, the pores of which represent only small degree of pore diamter fluctuation and smoothly curved circular or substantially circular opening configuration and the opening ratio of each of the pores relative to the both surfaces of the membrane amounts to at least 3.0.

A further object is to provide a cellulose acetate porous filter membrane of the above kind which has a relatively large filtering velocity as well as filtering capacity.

A still further object is to provide a membrane filter of the above kind which has a relatively high mechanical strength, as well as a superior back wash capability.

A still another object of the invention is to provide a porous membrane filter which can be manufactured by the simpler solvent evaporative manufacturing process.

A still further object is to provide a membrane filter of the above kind which contains substantially no plasticizer or the like harmful component and is highly suitable for use as the filtering medium in the filtration type artificial kidney organ or instrument.

BRIEF SUMMARY OF THE INVENTION

The characterizing feature of the cellulose acetate porous screen membrane filter may be summarized as follows:

The membrane is of the symmetry filter and represents at least 40% porosity; a thickness of 50 – 500 $\mu$; a pore opening diameter of 0.01 – 10 $\mu$ as observed at the both surfaces of the membrane. Each of the both opening ends of a pore passing laterally through the material of the membrane represents a non-serrated, smooth circular or nearly circular configuration. In addition, the opening ratio of the both open ends of each of the pores appearing at the both surfaces of the membrane amounts to at least 3.0. This membrane filter has a high mechanical strength and is very easily cleaned in a back washing step.

The process for the manufacture of the above kind improved, cellulose acetate screen membrane filter, constituting equally the present invention, may be carried into as follows:

A solution of cellulose acetate in an organic solvent is cast on a smooth solid surface into a thin layer and the latter is subjected to an evaporative step for the removal of the contained solvent, as the principal feature of the process. The cellulose acetate solution contains, however, a certain amount of a salt of a metal which is selected from the members of I – III families of the periodic table. The ionic radius of the metal should be less than 1.33 A. Preferably, the acetate solution may contain additive or additives to be described. In this way, a micro phase separation will occur during the evaporative membrane-forming step. Upon the formation of the membrane under the salting-out condition with the said metal salt, the latter is removed from the thus formed membrane to provide the latter with the desired filtering fine pores.

Depending upon the pore sizes of the thus formed porous membrane, it may be utilized for various purposes. Especially those membranes which have 0.01 – 0.1 $\mu$ pore opening sizes may preferably used as the filter elements in the artificial kidney organ or instrument.

DETAILED DESCRIPTION OF THE INVENTION

As was briefly referred to hereinbefore, the screen membrane type porous filter of cellulose acetate according to this invention is formed with a large number of fine bores passing through the material of the membrane, each of these bores appearing at the either surface thereof in the form of a smoothly curved circular or substantially circular opening configuration which has an opening diameter of $0.01 - 10$ $\mu$. These fine pores opening in the form of a smoothly curved circular or substantially circular opening configuration are highly and generally suitable for filtering off rod-like or elliptic particles at a favorable filtration efficiency.

Figure 1:
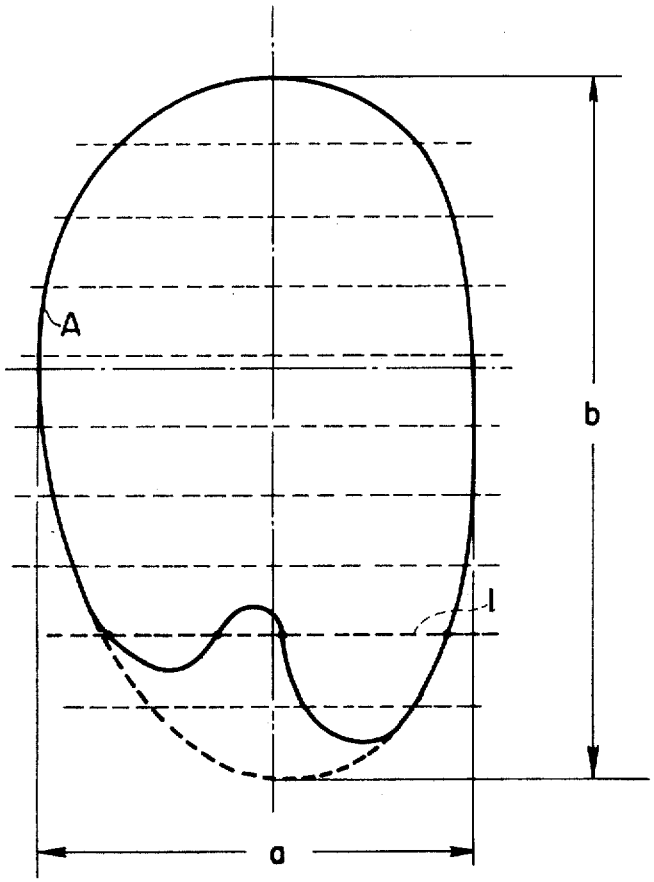
FIG. 1 is a schematic and enlarged representation of a representative pore opening configuration shown in a highly modelized way, as appearing on each surface of the porous filter membrane according to this invention.

The term "smoothly curved circular or substantially circular configuration" may be defined as follows:

The pore opening having a "smoothly curved" configuration as used herein can be defined as follows:

When a plurality of straight lines are drawn in parallel or at right angles to the major axis or minor axis of the pore configuration as at "A" in FIG. 1, any one of these straight lines crosses always at two points with the pore opening configuration curve. In this case, however, the mutual spacing of these straight lines is selected at 1/10 of the crossing major or minor axis.

As an example, the pore configuration is shown in full line at "A" in FIG. 1, of which the minor axis and the major axis are shown at $a$ and $b$, respectively. The parallel group of the straight lines are shown by horizontal dotted lines which are parallel to the minor axis $a$. One of these straight lines which is shown at $l$ crosses with the pore configuration curve at four points. Thus, the full-lined configuration curve is not "smoothly curved". Therefore, part of the configuration curve must be amended as shown in thick-dotted line curve.

The term "circular or substantially circular" can be defined that, when analogized with an ellipse, the ratio of minor axis to major axis : $a/b$ must be at least 0.75.

When at least 90% of the whole pores satisfy the abovementioned definitions, the clause "smoothly curved circular or substantially circular configuration" can be deemed as satisfied.

In the case of the cellulose acetate porous membrane according to this invention has the ratio of opening areas as appearing at the both surfaces of the membrane and of each pore passing through the material thereof should be at least 3.0. The meaning and the effect of this kind of ratio of opening areas of the pore will be explained by reference to FIG. 2, at (A) and (B).

Figure 2A:
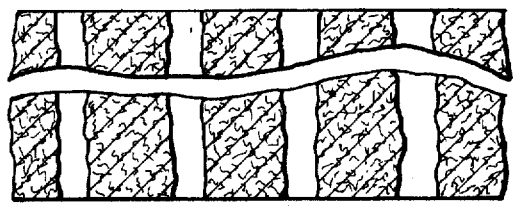
FIG. 2 is schematic and sectional comparison of the conventional representative membrane with that of the invention; each of these sections being taken laterally of the membrane and (A) showing the conventional and (B) showing the invention.
Figure 2B:
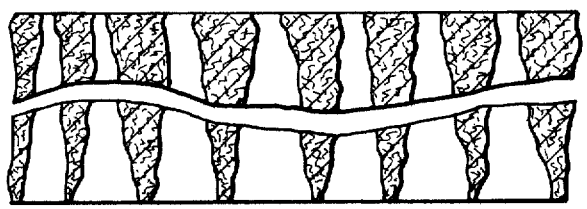

In FIG. 2, (A), a section through a conventional comparative membrane belonging to the second type referred to hereinbefore is shown. As seen, in this case, the pore opening diameters are substantially same with each other when seen at the both surfaces of the membrane. The pore diameter amounts generally to 0.4 $\mu$ - several $\mu$ and the thickness of the membrane amounts normally to the order of 50 - 100 $\mu$. The length of the pore passage amounts generally about 100 times the pore opening diameter, thus a considerable filtering resistance being necessarily encountered. Since the pore diameter varies slightly along the whole pore passage, the fine particles to be filtered may be retained at the inlet opening and at the midway of the pore passage, thereby the desirous easiness of back washing being substantially injured which means a considerable drawback in the art.

A similar sectional view of the porous membrane according to this invention is shown at (B) in FIG. 2, equally in a highly modelized style.

The surface of the membrane which represents smaller pore openings is utilized for filtration. This surface will be referred to as the "front surface" hereinafter. The pore diameter at this front surface varies between 0.01 $\mu$ – 10 $\mu$. This pore opening diameter in the mean can be selectively realized. For the filtration of draught beer, pore opening sizes of 0.6 – 2.0 $\mu$ are highly suitable. For the preparation of pure water adapted for use in the electronic industries, those of 0.4 $\mu$ in the mean are recommendable. For the medical service, such as for the artificial kidney, those of 0.01 – 0.1 $\mu$ are highly useful. The thickness of the membrane varies from 50 to 500 $\mu$ in the general sense which can be set to specific usage of the membrane.

It has been ascertained through practical experiments that the opposite membrane surface where the larger pore openings are seen and which will be referred to as "rear surface" or "back surface" hereinafter has substantially nothing to do with the filtering function, although it bears the mechanical strength of the membrane.

According to our practical experiments, it has been found that when the pore opening diameter appearing at the back surface amounts at least to three times that observed at the front surface, the membrane provides an optimum filtering performance, as well as superior back washing characteristic.

When each pore of the porous membrane represents circular or substantially circular openings at the front and back surfaces of the membrane, the mechanical strength of the latter can be substantially increased according to our practical experiments.

In order to prepare the cellulose acetate porous membrane, cellulose acetate having an acetyl content of 20 – 62.5% is dissolved in an organic solvent in the wt. ratio of 5 – 40% relative thereto, and the solution is added with a salt of a metal selected from the members belonging to the families of I – III of the periodic table and having an ionic radius less than 1.33 A. Then, the solution is casted on a polished surface or plate into a thin film which is then subjected to evaporation for removal of the solvent, thereby leaving a membrane, the latter is finally removed of the metal salt so as to form a large member of very fine pores penetrating through the membrane.

As the solvent for the preparation of the cellulose acetate solution, acetone, tetrahydrofuran or methylene chloride may, among others, be used. For the cellulose acetate having higher degree of acetylation, methylene chloride may be preferred for the solvent. The main solvent for the preparation of the cellulose acetate solution must preferably mixed with a diluent solvent, such as methanol, ethanol, propanol and/or ethanol. In this case, it is worthwile to mention that the diluent solvent has a higher boiling point than the main solvent, in addition to that it must be selected out from those which are capable of dissolving the metal salt to be added to the acetate solution. The reason for this is such that the acetate solution in advance of its casting into a thin film must be in the state of single phase. According to our experimental results, the porous membrane according to the present invention can not be prepared from a two phase solution. For the preparation of the cellulose acetate solution, the kind and amount of the diluent solvent should be selected upon experimental determination of its dissolving degree of the metal salt to be added, as well as its phase separating characteristics relative to the main solvent.

The concentration of the cellulose acetate in the solution to be used in the present invention varies from 5 to 40 wt. %, preferably 10 – 15 wt. %, relative to the solvent. With the concentration lesser than the above-specified lowest value, 5 wt. %, the porous membranes prepared therefrom will be too much brittle to be acceptable. On the other hand, with higher concentration than the above-specified highest value, 40 wt. %, it has been encountered with a substantial difficulty in the handling of the prepared membranes, in addition to the resulted reduction of the pore rate and of the pore sizes generally amounting to less than 0.01 $\mu$ and unable to observe even through an electron microscopic at regularly utilized magnifying factors as used throughout this specification. With such reduced pore sizes as amounting to less than 0.01 $\mu$, the membrane does not represent a screen membrane type filtering performance, although it may serve rather as a dialysis membrane adapted for, as an example, filtering off molecules or ions in a solution which feature has, however, nothing to do with the aimed objects according to this invention.

Metal ions employable in this invention for the formation of the metal salt in the foregoing sense may be such as:

sodium (ionic radius: 0.95 A.); potassium (1.33 A.); lithium (0.66 A.); magnesium (0.82 A.); calcium (0.99 A.); alminium (0.72 A.); copper (0.96 A.) and the like.

The order in the preference of these metals relative to the desired effects may preferably be:

lithium, sodium, magnesium, calcium > zinc > potassium, alminium and copper.

The opposite or coupling ions to the aforementioned metal ions for the formation of the metal salt may be any one of negative ions. In practice, however, halogen ion, or perchlorate ion providing a large solubility, is most recommendable to use.

Most preferable metal salts in the above sense may be $CaCl_2 \cdot 2H_2O$; $MgBr_2$; $LiCl$ and the like.

With use of the salts of Sn, Fe and the like which belong to higher families than IV of the periodic table, acceptable screen type membranes having full pass pores will not be obtained, as ascertained by our practical experiments.

Figure 3:
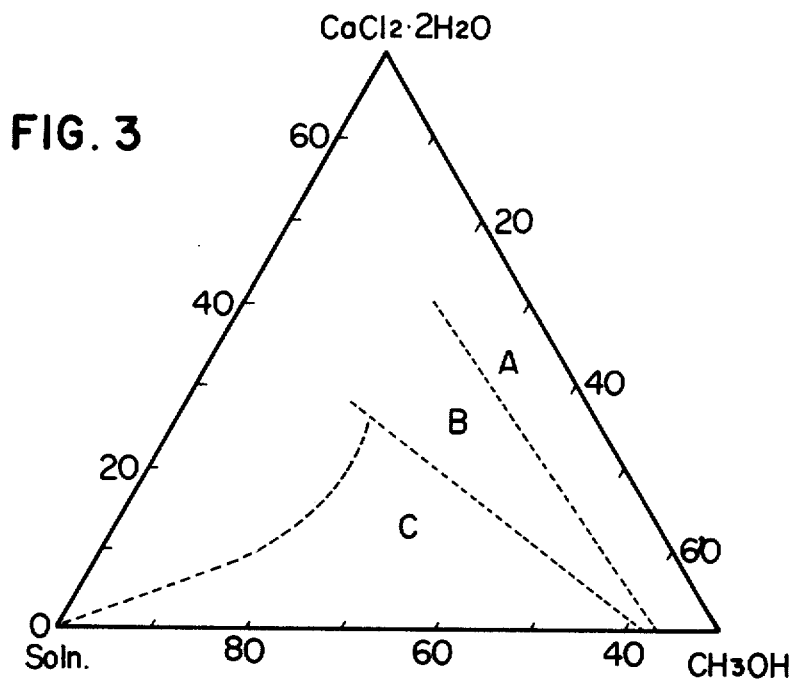
FIG. 3 is a triangular coordinate chart of a tricomponent system of $CaCl_2 \cdot 2H_2O/CH_3OH$/acetate solution, demonstrating its phase separation characteristics, wherein the dotted lines showing the separation.

The metal salt is added to the solution in the range of about 20 – 200 wt. % relative to the cellulose acetate. The salt causes a micro-phase separation of the cellulose acetate and in the course of the evaporative removal of solvent from the cellulose acetate solution. In order to realize such separation phenomenon as described above, according to our experiments, it is necessary to add the metal salt at least 20 wt. % relative to the acetate to its solution. Therefore, it will be seen from the foregoing that the adding quantity of the metal salt depends upon the concentration of cellulose acetate, the kinds and quantities of the main and diluent solvents. Generally speaking, it is possible by use of a triangular coordinate diagram, as shown by way of example in FIG. 3, to establish the necessary solvent percentage conditions for causing the single phase solution to invite a gel-forming condition through the way of the micro-phase separation. More specifically, FIG. 3 represents a triangle coordinate chart of a tri-component system of $CaCl_2 \cdot 2H_2O/CH_3OH$/acetate-solution (acetate/acetone = 10 g/100 ml), demonstrating the phase separation characteristics thereof. In this figure, "A" represents a two-phase separation region; "B" a micro-phase separation region of "C" a homogeneous phase region.

In the practice of the present invention, the amount of metal salt to be added to the acetate solution is so selected that before and during the cast-on-into-film step the latter is kept in its homogeneous phase, while, during its preparation stage for the porous membrane through the evaporative removal of solvent, a microphase separation is caused to appear.

In FIG. 3, if assumed there be not salting-out, the boundary between the regions "A" and "B" and that between the regions "B" and "C" must direct towards the point of 100% of $CaCl_2 \cdot 2H_2O$; but in practice, they direct to nearly 55%- and 35%-points, respectively. This shows that with increase of the added quantity of the metal salt, a correspondingly increased precipitation occurs.

We have broadly investigated into the nature and characteristics of the screen membrane filter according to this invention which has been prepared from the cellulose acetate solution added with specifically selected metal salt through evaporative removal of the solvent into a film, the latter being then deprived chemically of the included metal salt, and indeed, in consideration of the various modes of the preparation steps, as disclosed below:

1. In the case of addition of a metal salt in a quantity less than 2 wt. % relative to the cellulose acetate, the prepared membrane will become transparent, if the ionic radius of the metal is larger than 1.33 A., as of $Ba^{2+}$ or $Sr^{2+}$.

2. With use of a salt of a metal having ionic radius less than 1.33 A., as of Na, Ca or the like, in the form of its halide, in the quantity of less than 20 wt. % relative to cellulose acetate, the membrane represents a dual layer structure, as of the conventional reverse osmotic membranes.

3. With addition of a metal salt, the metal having an ionic radius less than 1.33 A., in the quantity of more than 20 wt. % relative to the cellulose acetate, the prepared membrane represents pores having end opening of larger than 0.01 µ when observed at the both surfaces of the membrane.

With further increase of the metal salt beyond 20 wt. %, a phase separation will appear in the solution and in advance of the cast-on and the like step for the preparation of the membrane. However, according to our practical observation, there exists a stabilized microphase separating state in advance of the appearance of the first mentioned phase separation. The occurence of this micro-phase separation can be clearly and definitely determined by observing a sudden reduction in the transparency of the acetate solution caused by the evaporative reduction of the solvent or by the increased addition of the metal salt, said transparency reduction being onserved by a sudden and substantial reduction of the penetrating light beams or of the diffusing light, during a continuous and constant application of light through a bath of the acetate solution. 4. In the case of the concentration of cellulose acetate in the solution amounting to higher than 10 wt. %, the mean pore size and the pore rate of the porous membrane as obtained with addition of the metal salt quantity with which the said micro-phase separation occurs, will be reduced with addition of larger quantity of the salt. With use of 200 wt. % or higher of the salt relative to the acetate, the porous membrane will become transparent again.

It should be stressed at this stage that the present invention has been realized only upon the detailed analysis of the behavior in the porous membrane formation, representing substantial difference therein by the occasional invitation of different kinds of phase separations.

It has been already known to prepare a reverse osmotic membrane from a concentrated cellulose acetate solution by adding several wt. % of a metal salt relative to the acetate and through an evaporative removal of the solvent from a film of the solution (refer to U.S. Pat. Nos. 3,360,459 and 3,415,038). These prior known processes have a certain resemblance with the present invention, so far as a concentrated cellulose acetate solution is used upon addition of a metal salt. However, when precisely analysed, a substantial difference in the membrane-forming mechanism could be established clearly. Or more specifically, the conventionally prepared membranes are, indeed, of the dual layer structure, where the metal salt has acted only as a kind of swelling agent, while, in the case of the present invention, the metal salt acts to cause the microphase separation, as well as the salting-out phenomenon.

According to our experiments, at least one of the following additives may be added to the cellulose acetate solution of the foregoing composition and previously added with the specifically selected metal salt, for the purpose of improving the prepared porous membrane, or more specifically for more uniforming the pore opening diameters, increasing the pore rate or porosity and enlarging the mean pore diameter:

aliphatic monohydric alcohols of $C_2 - C_5$ and their acetic acid esters;

saturated cyclic monohydric alcohols (such as cyclohexanol, cyclopentanol or the like); aqua-solution of monosaccharide (such as aqua-solution of polyhydric alcohol such as glucose, sacchalose or the like); alkyl ester of aromatic carboxylic acid (alkyl ester of benzoic acid, alkyl diester of phthalic acid or the like); cyclic hydrocarbons of $C_5 - C_{10}$ (such as decalin, tetralin, cyclohexane or the like); ethers (such as ethyl ether, diphenyl ether and the like);

At least a member selected from the above group may be added to the cellulose acetate solution including the metal salt. Since these additives are soluble in alcohol or water, an occasional amount of their residual in the membrane can be easily removed by treatment with alcohol or water, as the case may be.

The reason why the addition of these additives provides the aforementioned effect is supposed as such that it makes easier the invitation of the micro-phase separation caused by the addition of the metal salt and that the additive covers the film surface by virtue of its favorable conditions of surface tension by which coverage the evaporative velocity of the solvent for the acetate is advantageously controlled.

The adding quantity of the additive(s) may be less than 150 wt. %, preferably less than 100 wt. %, relative to the solvent for the cellulose acetate. More specifically to say, the necessary quantity may be definitely decided upon determination of the desired mean pore size and the porosity. As an example, when considering the use of such cellulose acetate solution prepared from acetate as its main solvent and mixed with ⅓ – ¼ wt. quanity of diluent methanol relative thereto, being further added with $CaCl_2 \cdot 2H_2O$ as the metal salt and with cyclohexanol as the additive, the relationship of the composition of the solution, on the one hand, and the pore size and the porosity of the prepared porous membrane, on the other, are diagrammatically illustrated in FIGS. 4 – 7.

Figure 4:
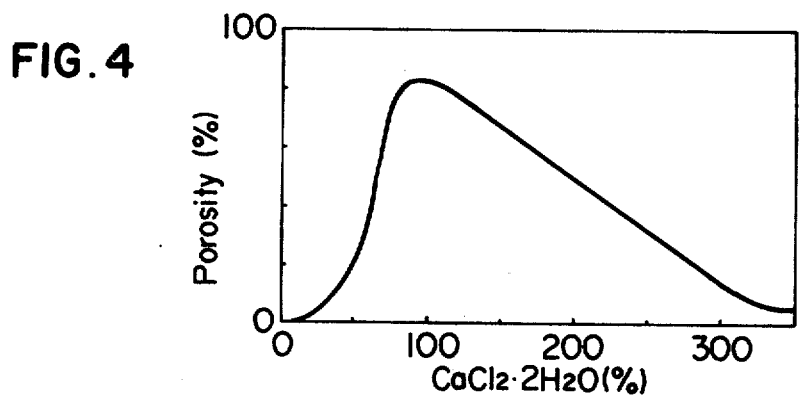
FIG. 4 is an explanatory chart demonstrating the effect of added amount of $CaCl_2 \cdot 2H_2O$ upon the porosity of the membrane prepared from a cellulose acetate solution having a composition of acetate/acetone/methanol/cyclohexanol mixture mixed in the wt. ratio of 12.5/100/25/62.5.

FIG. 4 shows a chart demonstrating the effect upon the porosity, %, by varying the added quantity of $CaCl_2 \cdot 2H_2O$ to a cellulose acetate dissolved in a mixed solvent : acetate/acetone/ methanol/cyclohexanol (12.5/100/25/62.5). In this figure, the quantity of $CaCl_2 \cdot 2H_2O$ is shown in its wt. % relative to the acetate. This will apply also to FIG. 5.

Figure 5:
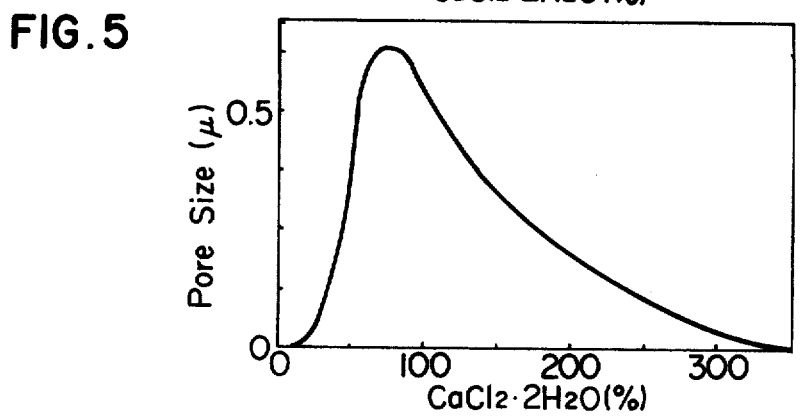
FIG. 5 is an explanatory chart demonstrating the effect of added amount of $CaCl_2 \cdot 2H_2O$ upon the pore size in the membrane prepared from the cellulose acetate solution having the same composition as in the foregoing FIG. 4.

FIG. 5 is a chart demonstrating the effect upon the pore size, $\mu$, of the added quantity of $CaCl_2 \cdot 2H_2O$ to the same acetate solution.

as seen from FIGS. 4 and 5, maxima of the porosity and the pore size appear at 80 – 100% of added quantity of $CaCl_2 \cdot 2H_2O$. Such phenomena could not be observed in any way in the case of the functional mechanism of the metal salt(s) in the preparatin of conventional reverse osmoic membranes, thus demonstrating a predominant feature of the invention.

Figure 6:
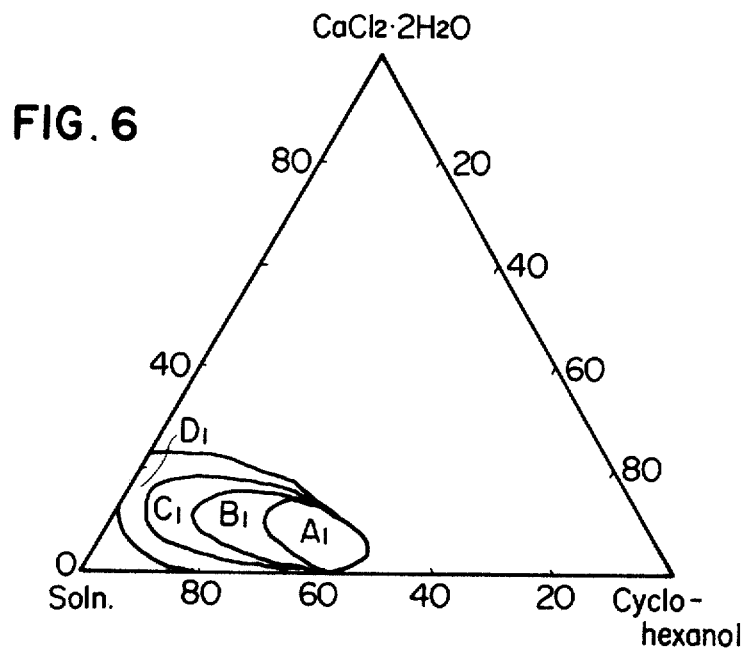
FIG. 6 is a triangular coordinate chart demonstrating the effect of added quantity of $CaCl_2 \cdot 2H_2O$ upon the pore size in a membrane prepared from a cellulose acetate solution of acetate/acetone/methanol/cyclohexanol mixture.

FIG. 6 is a triangle coordinate chart demonstrating the relationship between the pore size and the composition of a cellulose acetate solution using a mixed solvent : acetate/acetone/ methanol/cyclohexanol and added with $CaCl_2 \cdot 2H_2O$, wherein "Soln" represents a solution prepared by dissolving the acetate, 48 g, of the degree acetylation : 54%, in acetone, 300 ml, and further added with 100 ml of methanol.

In this FIG. 6, $A_1$-region represents that where over 97% of the pores have larger diameters than 0.15 $\mu$; $B_1$-region shows that where over 97% of the pores have larger diameters than 0.08 $\mu$. In $C_1$-region, over 97% of the pores have larger diameters than 0.02 $\mu$ and in $D_1$-region, the pores, over 97% again, have larger diameters than 0.01 $\mu$.

Figure 7:
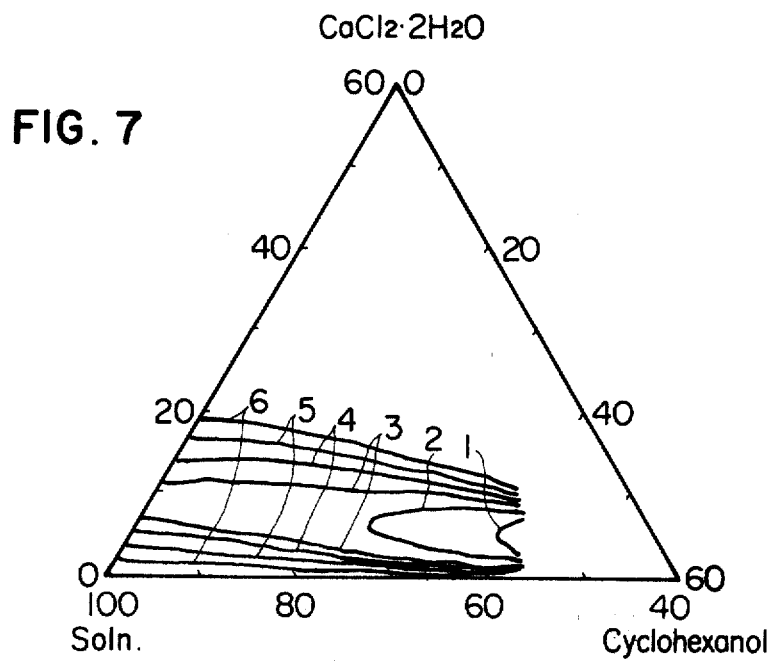
FIG. 7 is a triangular coordinate chart, demonstrating the effect of added quantity of $CaCl_2 \cdot 2H_2O$ upon the porosity of the membrane prepared from a cellulose acetate solution of acetate/acetone/methanol/cyclohexanol mixture.

FIG. 7 is a triangle coordinate chart, demonstrating the relationship of the porosity of the porous membrane filter and the composition of the cellulose acetate solution using a mixture of acetate/acetone/methanol/cyclohexanol added with $CaCl_2 \cdot 2H_2O$, where "Soln." means such that prepared from 125 g of the acetate of the degree acetylation : 54 % dissolved in 1000 ml of acetone and added with 250 ml of methanol.

In FIG. 7, the curves 1, 2, 3, 4, 5 and 6 represent those which define the respective regions of porosity of 80%, 70%, 60%, 50%, 40% and 30%, respectively.

As seen from FIGS. 6 and 7, the mean pore size as well as the porosity of the screen membrane type filter can be adjusted as desired according to the present invention by proper selection of the kinds and the adding quantities of the metal salt and additive.

It should be stressed, however, at this stage that the addition of the aforementioned additive(s) has a tendency of reducing the differential between the both pore opening sizes appearing at the both surfaces of the membrane to a certain degree and that a too much addition of the additive(s) will give rise to a loss of the smoothly curved configuration of the pore opening in the aforementioned sense.

The thus prepared and conditioned cellulose acetate solution is then processed into membranes, basically relying upon the solvent evaporation process. Thus, the solution is cast on into a thin film which is then deprived of the contained solvent by evaporation. For this purpose, more specifically, the solvent is applied, by way of example, on the smooth and even surface of a stationary or moving base, as the case may be, and developed into a thin film by the help of a doctor cooperating with the base. Or alternatively, the coller coating means cooperating with the base can be used with similar effects. The thickness of the thus cast-on film may be varied depending upon the final usage of the membrane filter.

The cast-on or developed solution into a thin film is deprived substantially of the contained solvent by natural evaporation in the negative way so to speak, or alternatively under heating in the positive way. The evaporation temperature should be adjusted to less than 50°C. If not, a reduction in the porosity and in the mean pore size would be encountered.

By adjusting the residual quantity of solvent to less than about 15 wt. %, the film is washed with water or methanol capable of dissolving away the contained metal salt for removal thereof. After this washing step, the membrane is dried according to any one of the known processes, so as to provide the final products, each having a thickness of 50 – 500 $\mu$.

The thus prepared and finished porous membranes according to this invention are ready for practical use. The usage may be varied according to the pore opening sizes. Those which have pore sizes 0.01 – 0.1 $\mu$ are of most importance, because they are highly adapted for use as the main working elements in an artificial kindey.

In the use of the artificial kidney fitted with the porous membrane filter according to the invention, no use is necessary of the circulating buffer liquid on the contrary to the conventional art, thereby the artificial kidney being built in a substantially reduced overall sizes and capable of being designed into a portable unit which is highly convenient and means a substantial progress in the art.

Generally speaking, human blood contains about 60 – 80 wt. % of water and the kidney diseased must be physically and almost periodically conditioned so as to remove excess aqueous content from his blood. In this case, protein and the like valuable blood constituents must not be removed off, while urea, ureic acid, creatinine and the like waste substances should be removed off.

The molecular weight of the water-soluble albumin of protein molecules contained in the blood is in the order of 65,000 and the size of molecule in aqueous solution may be similized to a sphere having a diameter of about 100 A. and thus, the membrane filter used for the artificial kidney must have pores of less than 100 A, (or A. than 0.01 $\mu$). A use of plane filter comprising a porous filtering membrane comparative to that proposed by the present invention has been recognized by those skilled in the art as insufficient to the filtering removal of excess aqueous content from human bood at a relatively low pressure (100 – 200 mmHg) comparative to the regular blood pressure. In addition, it has been believed that the filtration of blood by such porous membrane filter would result in a quick clogging of the fine bores with blood cells. It has been further believed among those skilled in the art that there is no other selectively in the permeability through the porous membrane than the molecular size. As a result of these prior considerations, it has been believed impossible to use such a membrane filter having pore sizes larger than 0.01 $\mu$ as the filter means in the field of artificial kidney.

In a representative proposal of artificial kidney of the filter type, dislcosed by way of example in U.S. Pat. No. 3,579,441 particle sizes corresponding to molecular weights 40,000 – 50,000 could not be well treated. Thus, the conventionally known membrane may have pore sizes in the maximum order of 0.01 $\mu$ or so, and thus, it is nearly an osmotic membrane which is generally used for the separation of molecules in a solution. A blood pressure filtration by such a conventionally proposed membrane and embodied in an artificial kidney will result in a larger size apparatus which is highly inconvenient as a portable one.

We have investigated into the relationship between the pore size and the filter performance of the porous membrane according to this invention and found that when the latter having the mean pore size larger than 0.01 $\mu$ is placed crosswise in a stream of liquid blood to be filtered, it can pass well therethrough even such particles as having molecular weights of 40,000 – 50,000, while serum substnaces contained in the blood can not be filtered to a satisfying degree.

It has been remarkably found that when the membrane is placed in the flow of the liquid and in parallel to the flowing direction, almost all the particles the radius of gyration of each of which is about a tenth of the pore size can not pass through the membrane filter. Based on such unique and novel observation, an application of the screen membrane filter to the artificial kidney has been realized with success and for the first time in the art.

Generally speaking, it is a well acknowledged fact that the penetration velocity of water or the like aqueous liquid through a fine pore varies with the quadruple of the pore size when observing a single pore alone, and with the square of the pore size when assuming that the porosity of the membrane should remain constant. Therefore, an increase of the pore size from 0.01 $\mu$ to 0.05 $\mu$ will accelerate the filtration velocity as high as 25 times, even if the porosity be assumed to be same. Therefore, an application of the screen membrane filter according to this invention to an artificial kidney will improve considerably the compactness and portability of the artificial kidney.

Upon measuring the filtration velocities with various and different pore sizes in the course of blood filtration by use of the porous membranes prepared by the inventive process, and upon execution of the analysis of the various filtrates, it was found that a ratio of albumin concentrations of the original blood and the filtrate, 100 : 5, was attained with a mean pore size of 0.01 $\mu$. With use of large pore sizes than the above specified value, the ratio became still more worse direction towards unity. In these experiments, the flow rate of blood under test was adjusted to about 200 ml/min.

It has been determined further during these experiments on blood filtration that there is an appreciable degree of unexpected selective performance in the filtration. As an example, when human blood is subjected to filtration through a porous cellulose acetate membrane according to this invention, having mean pore size of 0.10 $\mu$ and a porosity of 76%, various ratios of concentrations of included substantces in the blood alubumin existing before and after the filtration were measured as shown in the following Table I.

Table I

| Item | |
|---|---|
| Overall protein quantity | 0.05 |
| Ureic nitrogen in blood | 1.80 |
| Ureic acid | 1.30 |
| $Na^+$ | 1.20 |
| $Cl^-$ | 1.40 |
| $K^+$ | 1.75 |
| $Ca^{++}$ | 1.35 |
| $Mg^{++}$ | 1.0 – 1.2 |

As seen from the Table I, protein did not pass almost in any way through the membrane according to this invention, while ureic nitrogen in blood was subjected to a highly selective filtration. Such filtering characteristics are naturally highly favorable and desirous when the membrane is utilized for the filter type artificial kidney.

As may be well observed from the foregoing, the artificial kidney having the porous membrane(s) as its filter means having pore sizes of 0.01 – 0.10 $\mu$ and arranged in parallel to the flow direction of and in the blood to be subjected to purification, represents the following several superior features over the comparative conventional one:

1. Substantially no invitation of pore clogging.
2. The possibility of use of such an efficient porous membrane having the mean pore size as large about 10-times as the mean particle size of the substance to be filtered, thereby increasing the filtration velocity to about $10^2$ times. 3. Selective filtration performance relative to the substances to be filtered. 4. Realization of a miniatured portable and efficient artificial kidney.

Several preferred embodiments of such artificial kidney of the filter type using the porous membranes according to this invention is shown in FIGS. 8 – 11.

Figure 8:
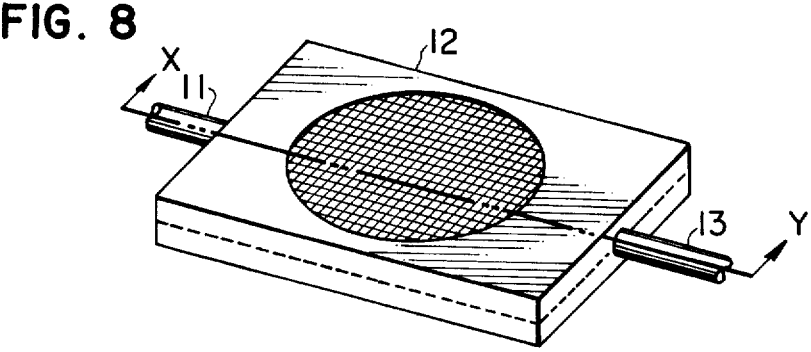
FIG. 8 is a perspective view of an artificial kidney organ of the planular filter type, using a porous membrane according to this invention as its filter element.
Figure 9:
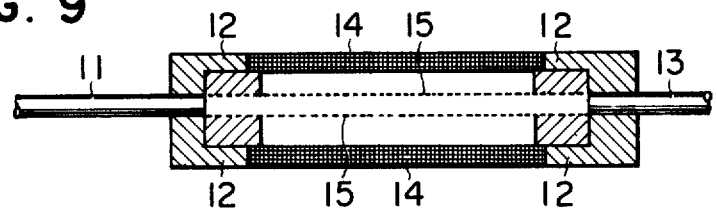
FIG. 9 is an axial section of the artificial kidney organ shown in the foregoing FIG. 8, the section being taken along a section line shown in FIG. 8.

In FIGS. 8 and 9, the first embodiment is shown in the form of a plane type artificial kidney. In this embodiment, numeral 11 represents a blood inlet pipe; 12 a frame; 13 an outlet pipe; 14 a pair of supporting and protecting meshes for respective membranes 15 which are arranged in parallel to each other.

In operation, inlet pipe 11 connected to the artery, not shown, of a patient, while outlet pipe 13 is connected with his vein, not shown.

Under blood pressure, waste substances contained in the blood are filtered off therefrom through the membranes 15. The meshes or gauzes 14 serve for prevention excess deformation of the membranes 15 subject ot the blood pressure and at the same time, they protect the membranes from mechanical damage caused from outside.

Figure 10:
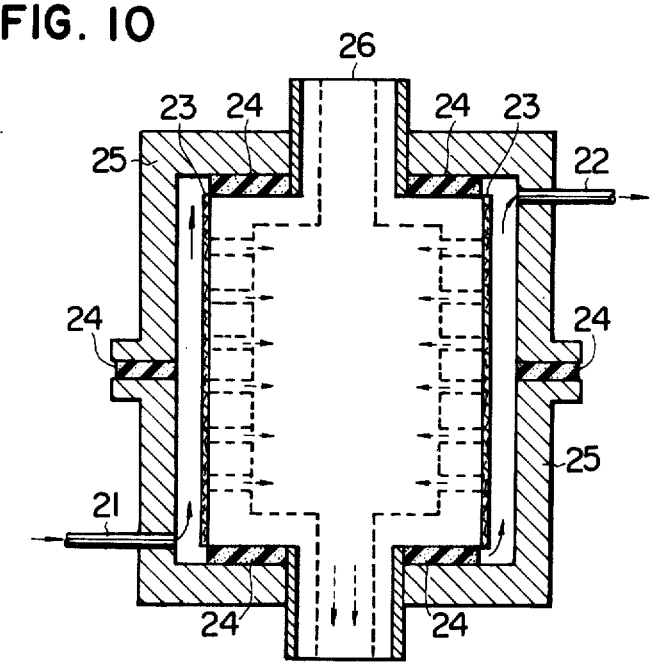
FIG. 10 is an axial section of an artificial kidney organ of the cylindrical filter type, utilizing a porous membrane according to this invention as its filter element.

FIG. 10 represents the second embodiment of the artificial kidney of the cylindrical type. In FIg. 10, numeral 21 demonstrates a blood inlet pipe; 22 and outlet pipe; 23 a pair of the porous membranes according to this invention; 24 several sealing means; 25 an outer cylindrical housing; 26 an inner hollow cylinder.

In operation, the blood will flow in the direction shown by a plurality of small full line arrows. The filtrate, after passing through the pores of the membranes, flows in the direction shown by dotted line arrows.

Figure 11:
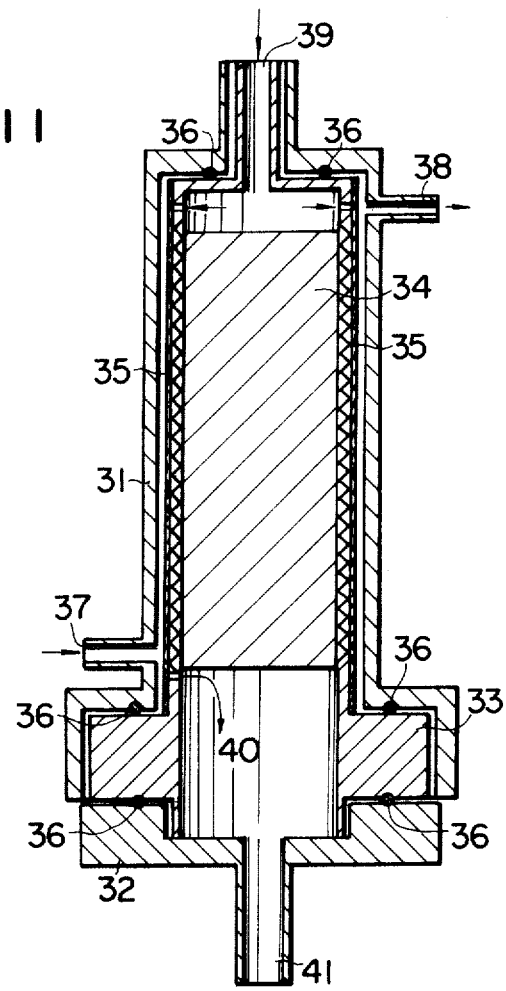
FIG. 11 is an axial section of a cylindrical type artificial kidney organ of the combined filter and dialyzer type, utilizing a porous membrane as its working element.
Figure 12:
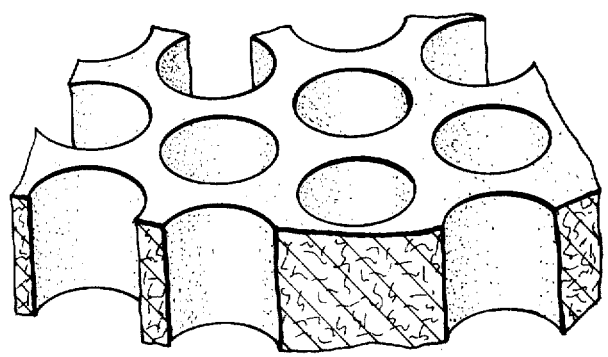
FIG. 12 is a perspective view of a part of a model of the screen filter membrane according to this invention.

FIG. 11 represents further embodiment of a cylindrical artificial kidney which is of the combined filtering and type. In this figure, numeral 31 represents an outer cylindrical housing; 32 an auxiliary outer hollow cylinder having an outlet for a circulating buffer solution; 33 and inner hollow cylinder; 34 a filter layer which is provided within the interior space of said inner cylinder; 35 a pair of porous membranes arranged in parallel to each other; 36 several sealing means; 37 a blood inlet; 38 an outlet for filtrate; 39 an inlet for the circulating buffer liquid; 40 an outlet in the inner cylinder for the buffer liquid (this outlet may serve as an outlet for the filtrate when the apparatus is used in the form of an exclusive filter); 41 an outlet in the outer cylinder for the buffer liquid (this outlet may serve as filtrate outlet when the apparatus is utilized exclusively in the form of a filter).

In operation, inlet 37 is connected with the artery of a patient and outlet 38 is connected with his vein. In the absence of buffer liquid, waste substances contained in the blood are passed under the influence of blood pressure through the membrane 35 and fine longitudinal grooves, not shown, formed on the outer surface of inner cylinder 33 and taken out through outlet 41. In the presence of the circulating buffer or osmosis liquid, connection has been made so as to establish a counter flow relationship between the both liquids. For this purpose, inlet and outlet for the buffer have been provided at 39 and 40, respectively. The buffer liquid is circulated under negative pressure as usual.

A feature of the apparatus shown in FIG. 11 resides in such that a quicker and accelerated removal of waste and aqueous constituents from the blood is possible with use of the buffer is possible when necessary. Normally, the blood can be filtered without use of the buffer. The inner cylinder 33 acting as a support for the membrane is formed on its outer surface with fine longitudinal grooves for the guidance of the filter-off substances, as briefly hinted above. In the presence of the buffer liquid, these grooves serve for washing the inner membrane surface therewith.

MODE OF OPERATION OF THE INVENTION

In the following, several numerical examples of the porous membrane according to this invention as well as the process for the manufacture of same will be described hereinbelow, after firstly disclosing several nomenclatures and/or brief explanation of the terms to be employed in the following description:

pore (opening) configuration and pore diameters, appearing at the both surfaces of the membrane: determined by observation through a scanning type electron microscope;

pore (opening or diameter) ratio = pore diameter at the front surface/pore diameter at the back surface of the membrane, determined from the thus microscopically observed results;

pore density: determined upon visual counting of real pores as observing through electron microscope and upon calculation by a corresponding multiplication to that per sq. cm;

porosity or pore ratio: calculated from the following formula:

$$\text{porosity (\%)} = \left\{ 1 - \frac{P_1}{P_0} \right\} \times 100$$

where, $P_1$ stands for apparent density of the membrane; $P_0$ for the density of cellulose acetate;

tensile strength: sample of the membrane, 5mm wide, 5 cm long, was fixed at its one end and loaded at its opposite end under room temperature (25°C), as determined when broken within 5 seconds from initiation of the loading;

dynamic elasticity: determined by use of a tester "Vibron DDV-II" manufactured and sold by a Japanese firm TOYO SOKKI Kabushiki Kaisha, at a frequency of 110 Hz and 25°C.;

filtration velocity: determined by measurement of the quantity of filtrate per unit area of the membrane and per unit time, at a pressure difference of 700 mmHg as applied;

filtration capacity: determined by measurement of the filtrate quantity at a pressure differential of 700 mmHg, starting from the initiation of filtration where the relationship between filtration velocity and filtrate shows a linear characteristic, and ending at such time point where the said relationship deviates suddenly and appreciably from the linear one, using as the filtration liquid a dispersion of styrene/butadiene rubber latex in water at a concentration of 50 – 500 p.p.m.

sereenity: the porous membrane was pressed on a press machine at a pressure of 800 kg/cm², 110°C, for 5 minutes. Then, the filtration velocity, $V_n$, was measured on the thus pressed membrane. In advance, the corresponding the filtration velocity, $V_f$, has been measured on the material porous membrane before pressing. The sereenity was determined from the following formula:

sereenity $= V_n/V_f$

EXAMPLE 1

250g, 100g and 45g of cellulose acetate of acetyl content of 54% were dissolved respectively in 1000ml of acetone. Each of these solutions were added with 600 ml of methanol. Then, 200g, 80g and 36g of $CaCl_2 \cdot 2H_2O$ were added to these solutions and cast on a plane and polished glass surface by use of a conventional applicator. Then, the solvent acetone was evaporated spontaneously at 25°C under 60%-relative humidity. After lapse of 10 minutes upon solvent evaporation, the formed membranes were peeled off from the glass plate and immersed in methanol or water bath for cleaning purpose and finally dried up.

The thickness of these membranes amounted to 300 $\mu$, 150 $\mu$ and 80 $\mu$, respectively.

Figure 13:
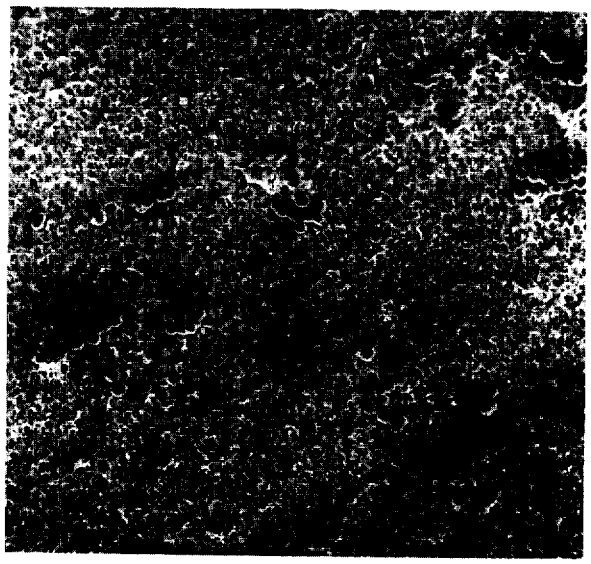
FIG. 13 is an electron microscopic photograph of a part of the front surface of a porous filter membrane according to this invention and especially adapted for use in a filter type artificial kidney organ, taken on a scanning type, the magnifying factor being 8,000.
Figure 14:
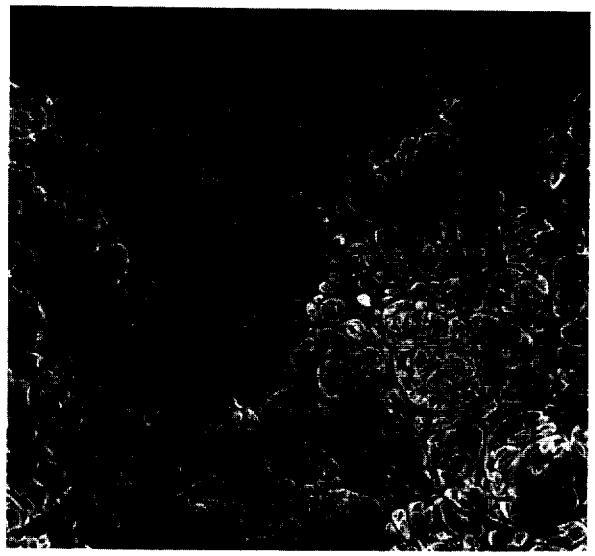
FIG. 14 is a similar photograph taken on the rear surface of the same membrane sample, the magnifying factor being, however, 2,500.

The first and third porous membranes prepared from the solutions of acetate 250g and 45g, respectively, were observed on a scanning type electron microscope, as shown in FIGS. 13 – 14 and FIGS. 15 – 16, respectively. FIG. 13 shows the electron microscope photograph, 8,000 times, taken on the front surface of the first membrane, while, FIG. 14 shows a similar view, 2,500 times, taken on the back surface of the same membrane. As seen, the pore openings represent each a smoothly curved round opening configuration, and those seen on the back surface represent each a smoothly curved substantially round configuration.

Figure 15:
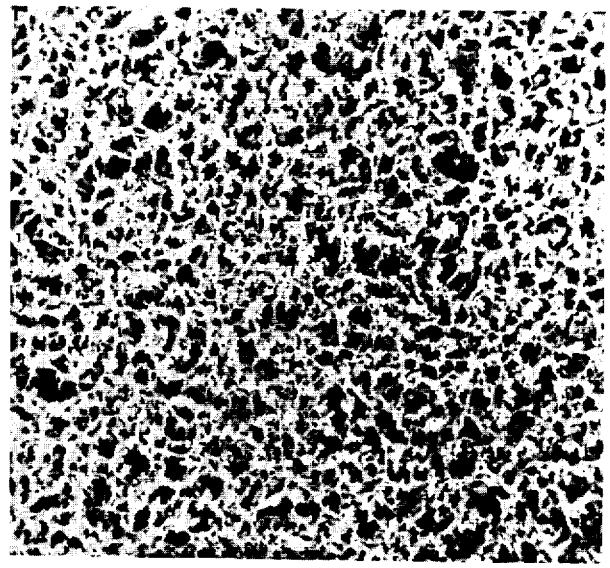
FIG. 15 is an electron microscopic photograph of the front surface of a sample prepared substantially conventionally as disclosed in the following Example 1, the magnifying factor being 4,000.
Figure 16:
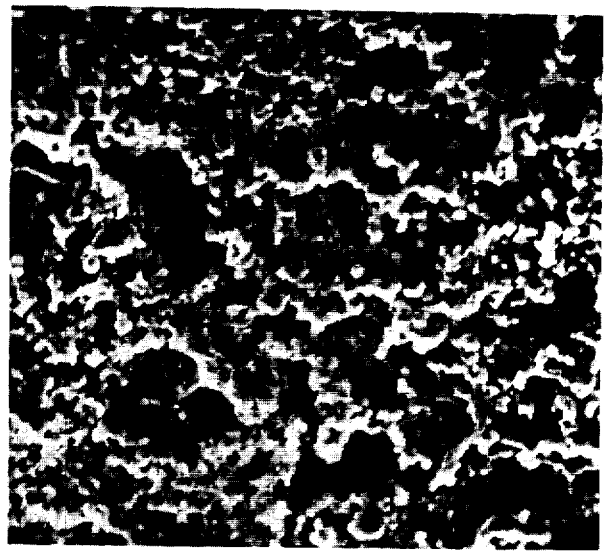
FIG. 16 is a similar photograph of the rear surface of the same membrane sample, the magnifying factor being 4,000.

In the case of FIGS. 15 – 16, showing the behavior of the third membrane prepared thus from the solution of a lower acetate concentration of 4.5 wt. %, the pore appearance is substantially similar to that of the conventional membrane. On this membrane, at its both surfaces, the pore configuration is highly serrated, thus such membrane being unsuitable for use as the screen membrane type filter. The electron microscopic photograph, 4000 times, shows a representative appearance of the front surface of the third membrane sample, while that shown in FIG. 16 is an electron microscopic photograph, 4,000 times, of the back surface of the same membrane.

Various physical characteristics of these membranes are tabulated in the following Table II.

and cyclohexanol as tabulated and a porous membrane was prepared in the similar manner as before.

The composition of the liquid used for the preparation of the porous membrane and several physical characteristics of the latter are also tabulated in the same Table III.

Table III

|  |  | Sample 1 | Sample 2 | Sample 3 | Sample 4 |
|---|---|---|---|---|---|
| Comp. of Sol. | acetate, g | 250 | 100 | 100 | 100 |
|  | methylene chloride, ml | 1000 | 1000 | 1000 | 1000 |
|  | methanol, ml | 250 | 80 | 160 | 240 |
|  | cyclohexanol, ml | 200 | 0 | 0 | 0 |
|  | kind of metal salt | $MgCl_2$ | $CaCl_2 \cdot 2H_2O$ | * | * |
|  | added quantity of metal salt, g | 200 | 40 | 80 | 120 |
| pore opening configuration | front surf. | ** | ** | ** | ** |
|  | back surf. | ** | ** | ** | ** |
| pore opening dia., $\mu$ | front surf. | 0.09 | 0.04 | 0.08 | 0.15 |
|  | back surf. | 2.0 | 1.0 | 0.80 | 0.75 |
| pore diameter ratio |  | 22 | 25 | 10 | 5 |
| porosity % |  | 73 | 42 | 52 | 80 |
| pore density, number of pores/cm² |  | $2.4 \times 10^8$ | $2.0 \times 10^8$ | $2.4 \times 10^8$ | $2.0 \times 10^8$ |
| modulus of tensile elasticity, dyne/cm² |  | $2.5 \times 10^2$ | $3.5 \times 10^2$ | $3.0 \times 10^2$ | $2.0 \times 10^2$ |
| dynamic elasticity, dyne/cm² |  | $3.3 \times 10^9$ | $4.9 \times 10^9$ | $4.0 \times 10^9$ | $2.0 \times 10^9$ |
| screenity |  | 0.85 | 0.90 | 0.87 | 0.75 |

Remarks:
*$CaCl_2 \cdot 2H_2O$;
**smoothly curved substantially round shape.

Table II

| Item | Acetate quantity | Inventive 250 g | Inventive 100 g | Reference 45 g |
|---|---|---|---|---|
| pore opening configuration | front surf. | smoothly curved round shape | smoothly curved substantially round shape | circular heavily serrated |
|  | back surf. | smoothly curved | | |
|  | surf. | substantially round shape | " | highly serrated shape |
| pore opening dia., $\mu$ | front surf. | 0.05 | 0.10 | ca. 0.2 |
|  | back surf. | 2.0 | 1.0 | ca. 0.4 |
| pore diameter ratio |  | 40 | 10 | ca. 2 |
| porosity, % |  | 76 | 77 | 78 |
| pore density, number of pores/cm² |  | $72.5 \times 10^8$ | $2 \times 10^8$ | $5 \times 10^7$ |
| tensile strength, dyne/cm² |  | $2.2 \times 10^2$ | $2.0 \times 10^2$ | $1.6 \times 10^2$ |
| dynamic elasticity, dyne/cm² |  | $3.0 \times 10^9$ | $1.5 \times 10^9$ | $1.0 \times 10^9$ |
| filtering velocity, ml/min. |  | 0.5 | 9 | 20 |
| filtration capacity, ml/cm² |  | 15 | 20 | 30 |
| screenity |  | 0.89 | 0.80 | 0.50 |

EXAMPLE 2

Cellulose acetate, of the acetyl content of 60%, was dissolved in a solvent mixture: methylene chloride/methanol and the conditions to be disclosed in the following Table III. The solution was added with metal salt

EXAMPLE 3

125 g of cellulose acetate, acetyl content of 54% were dissolved in 1,000 ml of acetone, and the solution was further added with methanol 250 ml and cyclohexanol 625 ml. 100 g of metal salt, tabulated in the following Table IV, was added to the solution which was then subjected to steps of casting-on solvent evaporation, washing and drying in the similar as explained in the foregoing Example 1. Various kinds of used metal salts and several physical properties of the thus prepared porous membranes are also tabulated. Use of $TeBr_4$, $SnCl_2$ and $Ba(CH_3COO)_2$ is also tabulated, however, only for the purpose of comparative reference.

Table IV

| Kind of used metal salt Physical properties |  | $TeBr_4$ | $SnCl_2$ | LiCl | $Ba(CH_3COO)_2$ | $Al(CH_3COO)_3$ | $ZnSO_4 \cdot 7H_2O$ | NaCl | $CuCl_2$ | $CaCl_2/MgCl_2$ |
|---|---|---|---|---|---|---|---|---|---|---|
| pore opening configuration | front surf. | * | * | ** | * | *** | ** | ** | ** | ** |
|  | back surf. | ** | ** | ** | ** | ** | ** | ** | ** | ** |

Table IV

| Kind of used metal salt / Physical properties | TeBr$_4$ | SnCl$_2$ | LiCl | Ba(CH$_3$COO)$_2$ | Al(CH$_3$COO)$_3$ | ZnSO$_4$.7H$_2$O | NaCl | CuCl$_2$ | CaCl$_2$/MgCl$_2$ |
|---|---|---|---|---|---|---|---|---|---|
| pore opening, μ  front surf. | <0.01 | <0.01 | 0.30 | <0.01 | 0.15 | 0.20 | 0.10 | 0.12 | 0.45 |
| back surf. | 2 | 2 | 2 | ca. 2 | 1.5 | 1.4 | 2.0 | 1.4 | 1.8 |
| pore diameter ratio | 7200 | 7200 | 6.6 | 7200 | 10 | 7.0 | 20 | 12 | 4.0 |
| porosity, % | 60 | 65 | 75 | 35 | 60 | 65 | 72 | 63 | 78 |
| pore density, number of pores/cm$^2$ | — | — | $1.0 \times 10^8$ | — | $3 \times 10^7$ | $6.5 \times 10^7$ | $1.2 \times 10^8$ | $5 \times 10^7$ | $2.4 \times 10^8$ |
| tensile strength, dyne/cm$^2$ | — | — | $1.4 \times 10^2$ | — | $2.4 \times 10^2$ | $2.2 \times 10^2$ | $1.7 \times 10^2$ | $2.8 \times 10^2$ | $1.1 \times 10^2$ |
| dynamic elasticity, — dyne/cm$^2$ | — | $3.1 \times 10^9$ | — | $6 \times 10^9$ | $4.5 \times 10^9$ | $3.0 \times 10^9$ | $4.1 \times 10^9$ | $2.8 \times 10^9$ | |
| filtering velocity, ml/min. | **** | **** | 60 | **** | 8 | 10 | 50 | 30 | 80 |
| filtration capacity, ml/cm$^2$ | **** | **** | 33 | **** | 50 | 40 | 25 | 20 | 45 |
| screenity | — | — | 0.80 | — | 0.71 | 0.65 | 0.77 | 0.78 | 0.82 |

Remarks:
*pores unable to observe;
**smoothly curved substantially round shape;
***slightly serrated round shape;
****almost nil.

Table V

| Added quantity of CaBr$_2$ / Phys. pro. | Sample 5 (Reference) 12.5 g | Sample 6 (Inventive) 50 g | Sample 7 (Inventive) 100 g |
|---|---|---|---|
| pore opening configuration  front surf. | * | ** | ** |
| back surf. | * | ** | ** |
| pore opening dia., μ  front surf. | 0.05 | 0.09 | 0.09 |
| back surf. | 1.0 | 1.2 | 1.8 |
| pore diameter ratio | 20 | 13 | 20 |
| porosity, % | 38 | 59 | 78 |
| pore density, number of pores/cm$^2$ | $1.2 \times 10^7$ | $4.8 \times 10^7$ | $6.2 \times 10^7$ |
| dynamic elasticity, dyne/cm$^2$ | $9.9 \times 10^9$ | $7.0 \times 10^9$ | $3.2 \times 10^9$ |
| filtering velocity, ml/min. | 0.1 | 3 | 11 |

Remarks:
*circular, yet partially serrated;
**smoothly curved substantially round shape.

EXAMPLE 4

125 g of cellulose acetate, acetyl content of 54% were dissolved in 1,000 ml of acetone, and the solution was further added with methanol 250 ml and n-butylacetate 375 ml. As tabulated in the following Table V, CaBr$_2$ was added to the solution which was then subjected to steps of casting-on, solvent evaporation, washing and drying in the similar manner as explained in the foregoing Example 1. Several physical properties of the thus prepared porous membranes are also tabulated in relation to the used quantities of CaBr$_2$.

Sample 5 (comparative reference) shows a lower adding quantity of CaBr$_2$, 10 wt. %, relative to the acetate, resulting in the pore openings of partially serrated configuration when observed at the front as well as back surface of the membrane. In this case, the porosity has been reduced unfavorably to 38%.

EXAMPLE 5

125 g of cellulose acetate, the acetyl content of 54%, were dissolved in each 1,000 ml of methylene chloride, tetrahydrofuran and acetone, respectively. To these solutions, 250 ml of methanol, ethanol and methanol were added, respectively, and further with 500 ml of decalin. To each of these solutions, 100 g of CaCl$_2$.2H$_2$O were added and the solutions were subjected to steps of casting-on, solvent evaporation, washing and drying, as in the foregoing Example 1.

Several physical properties of the thus obtained porous membranes are tabulated in the following Table VI.

Table VI

| main solvent / diluent solvent / Phys. pro. | methylene chloride / methanol/decalin | tetrahydrofuran / ethanol/decalin | acetone / methanol/decalin |
|---|---|---|---|
| pore opening configuration  front surf. | * | * | * |
| back surf. | * | * | * |
| pore opening dia., μ  front surf. | 0.35 | 0.20 | 0.45 |
| back surf. | 1.5 | 1.0 | 1.5 |
| pore diameter ratio | 4.0 | 5.0 | 3.3 |
| porosity, % | 72 | 70 | 76 |
| pore density, number of pores/cm$^2$ | $2.75 \times 10^8$ | $3.0 \times 10^8$ | $2.2 \times 10^8$ |
| dynamic elasticity, dyne/cm$^2$ | $3.2 \times 10^9$ | $3.0 \times 10^9$ | $2.5 \times 10^9$ |
| screenity | 0.69 | 0.74 | 0.75 |

Remarks:
*smoothly curved substantially round shape

EXAMPLE 6

120 g of cellulose acetate, the acetyl content of 50%, were dissolved in a solvent mixture consisting of 1,000 ml of methylene chloride and 100 ml of methanol. In the similar way, three solution baths were prepared and then, methanol was added thereto in quantities of 300 ml, 900 ml and 1,900 ml, respectively. In the case of the last bath added with methanol 1.900 ml, an appreciable phase separation occurred and only unacceptable porous membranes were prepared.

To these final solution baths containing overall methanol quantities of 100 ml, 400 ml and 1,000 ml, respectively, 120 g of $CaCl_2 \cdot 2H_2O$ and 300 ml of diphenyl ether were added, and these final solutions were subjected to steps of casting-on, solvent evaporation, washing and dried as before, so as to provide porous membrane filters.

In the case of the solution containing overall methanol quantity of 100 ml, however, the resulted membrane represented only appreciably uneven pore distribution, on account of the phase separation of $CaCl_2$ in the course of the membrane preparation stage, causing a precipitation thereof. This membrane must have been discarded. Further, in the case of the solution containing overall methanol content of 1,000 ml, the pore openings appearing at the both surfaces of the membrane were serratedly round, thus the membrane being discarded again (screenity : 0.50).

The membrane prepared from the remaining solution containing overall 400 ml of methanol showed smoothly curved substantially circular pore opening configurations at the both sides of the membrane, thus being accepted (screenity : 0.65).

EXAMPLE 7

125 g of cellulose acetate, the acetyl content of 54% were dissolved in 1,000 ml of acetone and added with 250 ml of methanol and further with 125 g of $CaCl_2 \cdot 2H_2O$.

To this solution, 500 ml of any one of the following auxiliary solvents tabulated in the following Table VII. Each of these solutions was subjected to steps of casting-on, solvent evaporation, washing and drying, as before.

The relationship between several physical properties of the membrane, on the one hand and the kinds of added diluent solvents and additives, on the other, are demonstrated in the following Table VII.

EXAMPLE 8

Solutions were prepared by dissolution of cellulose acetate, the acetyl content of 54%, in the manner as substantially tabulated in the following Table VIII, and then, these solutions were processed into porous membrane as before. See, Samples 8 and 9.

By use of these samples membranes, artificial kidneys were prepared in the mode as shown in FIG. 10. Blood filtration characteristics were as shown in the following Table IX.

Table VIII

|  | acetate, g | Sample 8 150 | Sample 9 250 |
|---|---|---|---|
| Comp. of Sol. | acetone, ml | 1000 | 1000 |
|  | methanol, ml | 250 | 700 |
|  | $CaCl_2 \cdot 2H_2O$, g | 180 | 250 |
|  | cyclohexanol, ml | 300 | 0 |
|  | pore opening front surf. configuration, back surf. | * * | * * |
|  | pore opening front surf. dia., $\mu$ back surf. | 0.08 1.9 | 0.07 2.1 |
|  | pore diameter ratio | 20 | 30 |
|  | porosity, % | 76 | 76 |
|  | pore density, number of pores/cm² | $30 \times 10^8$ | $30 \times 10^8$ |
|  | tensile strength, dyne/cm² | $2.4 \times 10^2$ | $2.3 \times 10^2$ |
|  | dynamic elasticity, dyne/cm² | $2.7 \times 10^9$ | $2.9 \times 10^9$ |
|  | filtering velocity, ml/min. | 10 | 6 |
|  | filtration capacity, ml/cm² | 50 | 52 |
|  | sreenity | 0.88 | 0.89 |

Remarks:
*smoothly curved substantially round shape.

Table IX

| porous membrane Item | Sample 8 | Sample 9 |
|---|---|---|
| blood filtering conditions |  |  |
| blood flow velocity, ml/min. | 160 | 160 |
| blood pressure, mmHg | 160 | 160 |
| inlet blood pressure, mmHg | 100 | 100 |
| outlet blood pressure, ml | 220 | 220 |
| Composition of blood before test |  |  |
| total protein, g/dl | 7.2 | 7.2 |
| ureic nitrogen, mg/dl | 16 | 16 |
| ureic acid, mg/dl | 6.0 | 6.0 |

Table VII

| diluent solvent Phys. property | | ethanol | isopropyl alcohol | n-butyl alcohol | saccharose plus water (2:1) | ethyl acetate |
|---|---|---|---|---|---|---|
| pore opening configuration, | front surf. back surf. | * * | * * | * * | * * | * * |
| pore opening dia., $\mu$ | front surf. back surf. | 0.50 2.0 | 0.45 2.2 | 0.35 2.0 | 0.55 2.2 | 0.30 2.1 |
| pore diameter ratio | | 4.0 | 4.9 | 5.7 | 4.0 | 7.0 |
| porosity, % | | 78 | 77 | 77 | 76 | 69 |
| pore density number of pores/cm² | | $3.0 \times 10^8$ | $3.0 \times 10^8$ | $2.8 \times 10^8$ | $2.9 \times 10^8$ | $2.9 \times 10^8$ |
| dynamic elasticity, dyne/cm² | | $2.0 \times 10^9$ | $2.2 \times 10^9$ | $2.8 \times 10^9$ | $2.8 \times 10^9$ | $3.1 \times 10^9$ |

| diluent solvent Phys. property | | tetralin | methyl cyclohexane | ethyl ether | dimethyl-phthalate | diethyl-phthalate | dibutyl-phthalate |
|---|---|---|---|---|---|---|---|
| pore opening configuration | front surf. back surf. | * * | * * | * * | * * | * * | * * |
| pore opening dia., $\mu$ | front surf. back surf. | 0.48 1.5 | 0.46 1.8 | 0.45 1.8 | 0.33 1.7 | 0.32 1.3 | 0.39 2.0 |
| pore diameter ratio | | 7.2 | 3.9 | 4.0 | 5.2 | 4.1 | 5.1 |
| porosity, % | | 70 | 74 | 76 | 66 | 67 | 76 |
| pore density, number of pores/cm² | | $3.1 \times 10^8$ | $3.1 \times 10^8$ | $3.1 \times 10^8$ | $2.8 \times 10^8$ | $2.8 \times 10^8$ | $3.0 \times 10^8$ |
| dynamic elasticity, dyne/cm² | | $3.1 \times 10^9$ | $2.9 \times 10^9$ | $2.9 \times 10^9$ | $3.2 \times 10^9$ | $3.1 \times 10^9$ | $3.0 \times 10^9$ |

Remarks:
*smoothly curved substantially round shape.

Table IX—Continued

| porous membrane Item | Sample 8 | Sample 9 |
| --- | --- | --- |
| Na, m.Eq./dl | 152 | 152 |
| Cl, m.Eq./dl | 80 | 80 |
| K, m.Eq./dl | 5.9 | 5.9 |
| Ca, m.Eq./dl | 6.4 | 6.4 |
| Mg, m.Eq./dl | 1.9 | 1.9 |
| Composition of blood after test | | |
| total protein, g/dl | 7.2 | 7.2 |
| ureic nitrogen, mg/dl | 10.5 | 11.0 |
| ureic acid, mg/dl | 4.2 | 4.2 |
| Na, m.Eq./dl | 14.9 | 150 |
| Cl, m.Eq./dl | 71 | 73 |
| K, m.Eq./dl | 5.2 | 5.2 |
| Ca, m.Eq./dl | 5.3 | 5.2 |
| Mg, m.Eq./dl | 1.9 | 1.9 |
| filtration velocity, ml/hr.cm$^2$ | 0.25 | 0.20 |
| Composition of blood as measured at 80 – 90 minutes from initiation of test | | |
| number of red blood corpuscles/cc | 0 | 0 |
| total protein, g/dl | 0.5 | 0.4 |
| ureic nitrogen, mg/dl | 19.3 | 19.4 |
| ureic acid, mg.dl | 4.8 | 4.9 |
| Na, m.Eq./dl | 165 | 169 |
| Cl, m.Eq./dl | 79 | 79 |
| K, m.Eq./dl | 6.7 | 6.4 |
| Ca, m.Eq./dl | 5.9 | 5.9 |
| Mg, m.Eq./dl | 1.3 | 1.4 |

Remarks.
"m.Eq." means molecular equivalent.

EXAMPLE 9

Figure 17:
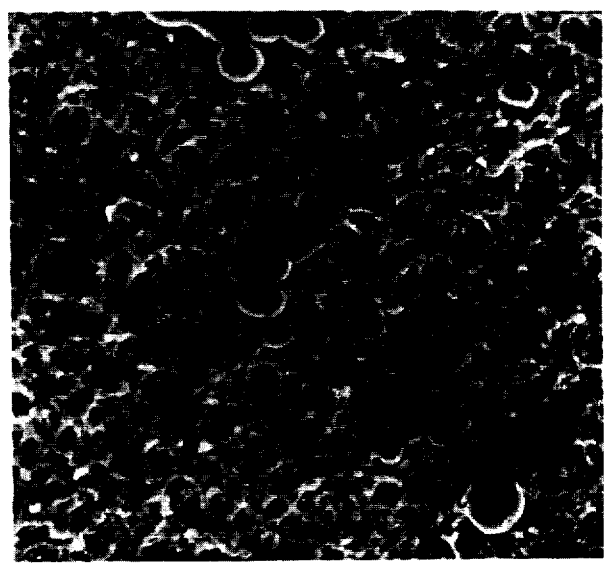
FIG. 17 is an electron microscopic photograph of the front surface of a sample of the porous membrane according to this invention, the magnifying factor being 4,000.
Figure 18:
FIG. 18 is a similar photograph of the rear surface of the same membrane sample, the magnifying factor being again 4,000.

100 g of cellulose acetate, the acetyl content of 54%, were dissolved in 1,000 ml of acetone and the solution was added with 250 ml of methanol and 80 g of CaCl$_2$.2H$_2$O, and further with 600 ml of cyclohexanol. The thus prepared solution was processed into a porous membrane as before. The appearance observed at the front surface of the membrane through an electron microscope is shown in FIG. 17 (×4,000). The corresponding appearance at the back surface is shown in FIG. 18 (×4,000).

This membrane was successfully used as the final stage membrane filter for ion exchange water used in an industrial preparation of ultra-pure water. Electric resistance of the ion exchange water measured in advance of the filtration amounted to 15 × 10$^5$ ohm. cm, while the filtrate showed 100 × 10$^5$ ohm. cm. Several physical data of the membrane are shown in the following Table X.

Table X

| pore opening configuration, | front surf. | smoothly curved substantially round shape |
| --- | --- | --- |
| | back surf. | '' |
| pore opening dia., μ | back surf. | 2.9 |
| | front surf. | 0.46 |
| pore diameter ratio | | 6.2 |
| porosity, % | | 78 |
| pore density, number of pores/cm$^2$ | | 3.6 × 10$^8$ |
| tensile strength, Kg/cm$^2$ | | 1.8 × 10$^2$ |
| dynamic elasticity, dyne/cm$^2$ | | 2.3 × 10$^9$ |
| filtering velocity, ml/min.cm$^2$ | | 85 |
| filtration capacity, ml/cm$^2$ | | 60 |
| screenity | | 0.76 |

EXAMPLE 10

Figure 19:
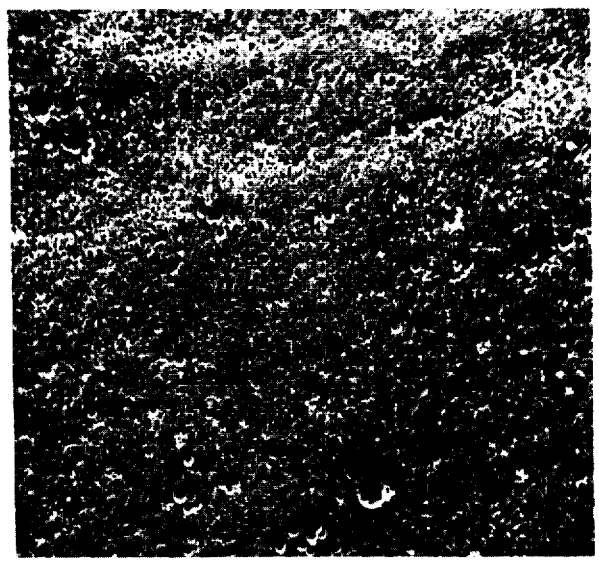
FIG. 19 is an electron microscopic photograph of the front surface of a sample porous membrane according to this invention and prepared so as to use for beer filtration purpose, the magnifying factor being 750.
Figure 20:
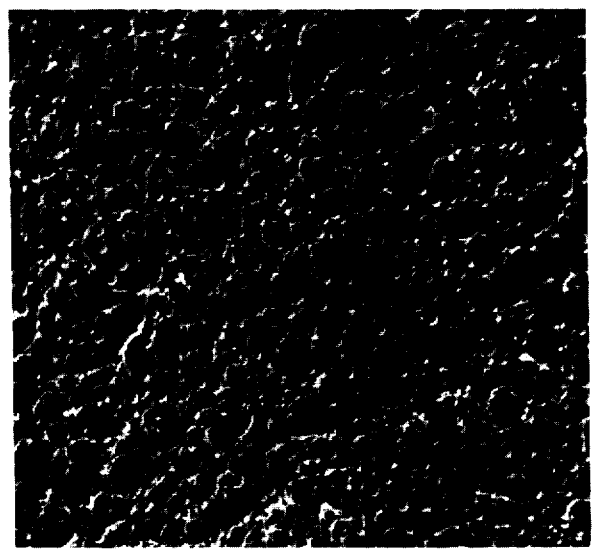
FIG. 20 is a similar photograph of the rear surface of the same membrane sample, the magnifying factor being again 750.

100 g of cellulose acetate, the acetyl content of 54%, were dissolved in 1,000 ml of acetone and the solution was added with 250 ml of methanol and 80 g of CaCl$_2$.2H$_2$O. The solution was further added with 850 ml of cyclohexanol, and then processed into a porous membrane as before. An electron photograph of the front surface of this membrane, ×750, is shown in FIG. 19. A similar photograph of the rear surface, × 750, is shown in FIG. 20. This membrane was successfully utilized in the filtration service for removal of beer yeast. When fermented beer was filtered through the membrane, the filtrate was completely filtered off the yeast.

Several physical properties of the membrane are shown in the following Table XI.

Table XI

| pore opening configuration, | front surf. | smoothly curved substantially round shape |
| --- | --- | --- |
| | back surf. | partially serrated, substantially circular shape |
| pore opening dia., μ | front surf. | 0.8 |
| | back surf. | 3.3 |
| pore diameter ratio | | 4.1 |
| porosity, % | | 81 |
| pore density, number of pores/cm$^2$ | | 1.2 × 10$^8$ |
| tensile strength, Kg/cm$^2$ | | 9.0 × 10 |
| dynamic elasticity, dyne/cm$^2$ | | 1.2 × 10$^9$ |
| filtering velocity, ml/min.cm$^2$ | | 180 |
| filtration capacity, ml/cm$^2$ | | 75 |
| screenity | | 0.65 |

The embodiments of the invention in which an exclusive property or privilege is claimed are as follows:

1. A process for the manufacture of a cellulose acetate porous membrane which comprises:
    a. dissolving in a main organic solvent cellulose acetate having an acetyl content of 20 to 62.5%, the cellulose acetate being dissolved in the solvent in a weight ratio of 5 to 40% relative to the solvent,
    b. adding to the solution a diluent solvent having a boiling point higher than the main solvent,
    c. adding to the resulting solution a metal salt, wherein the metal is selected from Groups I–III of the Periodic Table and has an ionic radius of less than 1.33 A, said metal salt being added to the solution in a weight ratio of 20 to 200% relative to the acetate to provide a homogeneous solution,
    d. casting the resulting solution onto a polished plane surface to form a thin film,
    e. removing the solvent from the film by evaporation at a temperature of less than 50°C and
    f. removing the metal salt from the film by dissolving the salt therefrom to produce a porous membrane.

2. The process of claim 1 wherein the cellulose acetate is present in a weight ratio of 10 to 15%.

3. The process of claim 2 wherein the metal salt is present in a weight ratio of 80 to 180%.

4. The process of claim 1 wherein the diluent solvent is methanol and the metal salt is a member selected from the group consisting of CaCl$_2$.2H$_2$O, MgBr$_2$ and LiCl.

5. A process for the manufacture of a cellulose acetate porous membrane which comprises:
    a. dissolving in a main organic solvent cellulose acetate having an acetyl content of 20 to 62.5%, the cellulose acetate being dissolved in the solvent in a weight ratio of 5 to 40% relative to the solvent,
    b. adding to the solution a diluent solvent having a boiling point higher than the main solvent, and
c. adding to the resulting solution a metal salt, wherein the metal is selected from Groups I–III of the Periodic Table and has an ionic radius of less than 1.33 A., said metal salt being added to the solution in a weight ratio of 20 to 200% relative to the acetate to provide a homogeneous solution,
d. adding to the solution at least one additive selected from the group consisting of:
  a. aliphatic monohydric alcohols of $C_2 - C_5$ and their acetic acid esters;
  b. saturated cyclic monohydric alcohols;
  c. aqueous solution of monosaccharide;
  d. alkyl esters of aromatic carboxylic acid;
  e. cyclic hydrocarbons of $C_5 - C_{10}$; and
  f. ethers;
  said additives being present in an amount of less than 150% by weight of the solvent for the cellulose acetate, to provide a homogeneous solution,
e. casting the resulting solution onto a polished plane surface to form a thin film,
f. removing the solvent from the film by evaporation at a temperature of less than 50°C, and
g. removing the metal salt from the film by dissolving the salt therefrom to produce a porous filtering membrane.

6. The process of claim 5 wherein the cellulose acetate is present in a weight ratio of 10 to 15%.

7. The process of claim 6 wherein the metal salt is present in a weight ratio of 80 to 180% and the additive is present in a weight ratio of less than 100%.

8. The process of claim 4 wherein the diluent solvent is selected from the group consisting of methanol, ethanol and propanol and mixtures thereof, and the metal salt is selected from the group consisting of $CaCl_2.2H_2O$, $MgBr_2$ and $LiCl$.

9. The process of claim 8 wherein the additive is cyclohexanol.

10. The process of claim 8 wherein the additive is an acetic ester of an aliphatic monohydric alcohol having 2 to 5 carbon atoms.

11. The process of claim 8 wherein the additive is a member selected from the group consisting of decalin, tetralin and cyclohexane.

* * * * *